United States Patent [19]

Ho et al.

[11] Patent Number: 5,241,039
[45] Date of Patent: Aug. 31, 1993

[54] POLYIMIDE/ALIPHATIC POLYESTER COPOLYMERS WITHOUT PENDENT CARBOXYLIC ACID GROUPS (C-2662)

[75] Inventors: W. S. Winston Ho; Guido Sartori, both of Annandale; Suh J. Han, Branchburg, all of N.J.

[73] Assignee: Exxon Research & Engineering Company, Florham Park, N.J.

[21] Appl. No.: 929,234

[22] Filed: Aug. 14, 1992

[51] Int. Cl.⁵ .................. C08G 73/10; C08G 63/00
[52] U.S. Cl. ................................. 528/322; 528/176; 528/272
[58] Field of Search ............... 528/322, 176, 272

[56] References Cited
FOREIGN PATENT DOCUMENTS
51-139832 12/1976 Japan .

Primary Examiner—John Kight, III
Assistant Examiner—T. Mosley
Attorney, Agent, or Firm—Ronald D. Hantman

[57] ABSTRACT

The present invention includes new polyimide/polyester copolymers without pendent carboxyl groups, a method for their synthesis, and their use as membranes for aromatics/saturates separation.

14 Claims, 3 Drawing Sheets

POLYIMIDE/ALIPHATIC POLYESTER COPOLYMERS WITHOUT PENDENT CARBOXYLIC ACID GROUPS (C-2662)

BACKGROUND

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient driving force. The process can be used to separate a wide variety of mixtures including various petroleum fractions, naphthas, oils, and hydrocarbon mixtures. Expressly recited is the separation of aromatics from kerosene.

U.S. Pat. No. 2,958,656 teaches the separation of hydrocarbons by type, i.e., aromatic, unsaturated, and saturated, by permeating a portion of the mixture through a non-porous cellulose ether membrane and removing permeate from the permeate side of the membrane using a sweep gas or liquid. Feeds include hydrocarbon mixtures, e.g., naphtha (including virgin naphtha, naphtha from thermal or catalytic cracking, etc.).

U.S. Pat. No. 2,930,754 teaches a method for separating hydrocarbons, e.g., aromatic and/or olefinic from gasoline-boiling-range mixtures by the selective permeation of the aromatic through certain nonporous cellulose ester membranes. The permeated hydrocarbons are continuously removed from the permeate zone using a sweep gas or liquid.

U.S. Pat. No. 4,115,465 teaches the use of polyurethane membranes to selectively separate aromatic from saturates via pervaporation. U.S. Pat. Nos. 5,028,685 and 5,093,003 disclose halogenated polyurethanes and membranes therefrom for separating aromatics from saturates.

U.S. Pat. Nos. 4,944,880 and 4,990,275 describe polyimide/aliphatic polyester copolymers and membranes therefrom for the separation of aromatics from saturates. U.S. Pat. Nos. 4,946,594 and 4,997,906 describe crosslinked copolymers of aliphatic polyester diols and dianhydrides and membranes therefrom for the separation of aromatics from saturates.

U.S. Pat. No. 4,976,868 covers the use of polyester membranes (e.g., polyethylene terephthalate, polybutylene terephthalate, and polyethylene terephthalate/-cyclohexane-dimethanol terephthalate) for aromatics/-saturates separation. U.S. Pat. Nos. 5,012,036, 5,012,035, and 5,019,666 teach the use of polyarylate, polyphthalate-carbonate, and nonporous polycarbonate membranes, respectively, to separate aromatics from saturates. U.S. Pat. No. 5,055,631 discloses sulfonated polysulfone membranes for the separation of aromatics from saturates. U.S. Pat. No. 5,128,439 describes saturated polyesters and crosslinked membranes therefrom for aromatics/saturates separation.

The present invention describes new polyimide/aliphatic polyester copolymers. Compared to those described in U.S. Pat. Nos. 4,944,880 and 4,990,275, the copolymers of the present invention do not contain pendent carboxylic acid groups. In addition, the present invention describes a synthesis of the copolymers by reaction of trimellitic anhydride acid chloride, a polyester diol, and an aromatic diamine. Furthermore, the present invention describes the use of the above copolymers to make membranes for the separation of aromatics from saturates.

Compared to distillation, membrane permeation can lead to considerable energy savings. A membrane can separate a mixture of aromatics and saturates, e.g., a heavy catalytic naphtha, into a high-octane, mainly aromatic permeate and a high-cetane, mainly saturated retentate. Both permeate and retentate are more valuable than the starting heavy catalytic naphtha.

SUMMARY OF THE INVENTION

The present invention includes new polyimide/-polyester copolymers without pendent carboxyl groups, a method for their synthesis, and their use as membranes for aromatics/saturates separation.

DESCRIPTION OF THE PREFERRED EMBODIMENT

Figure 1:
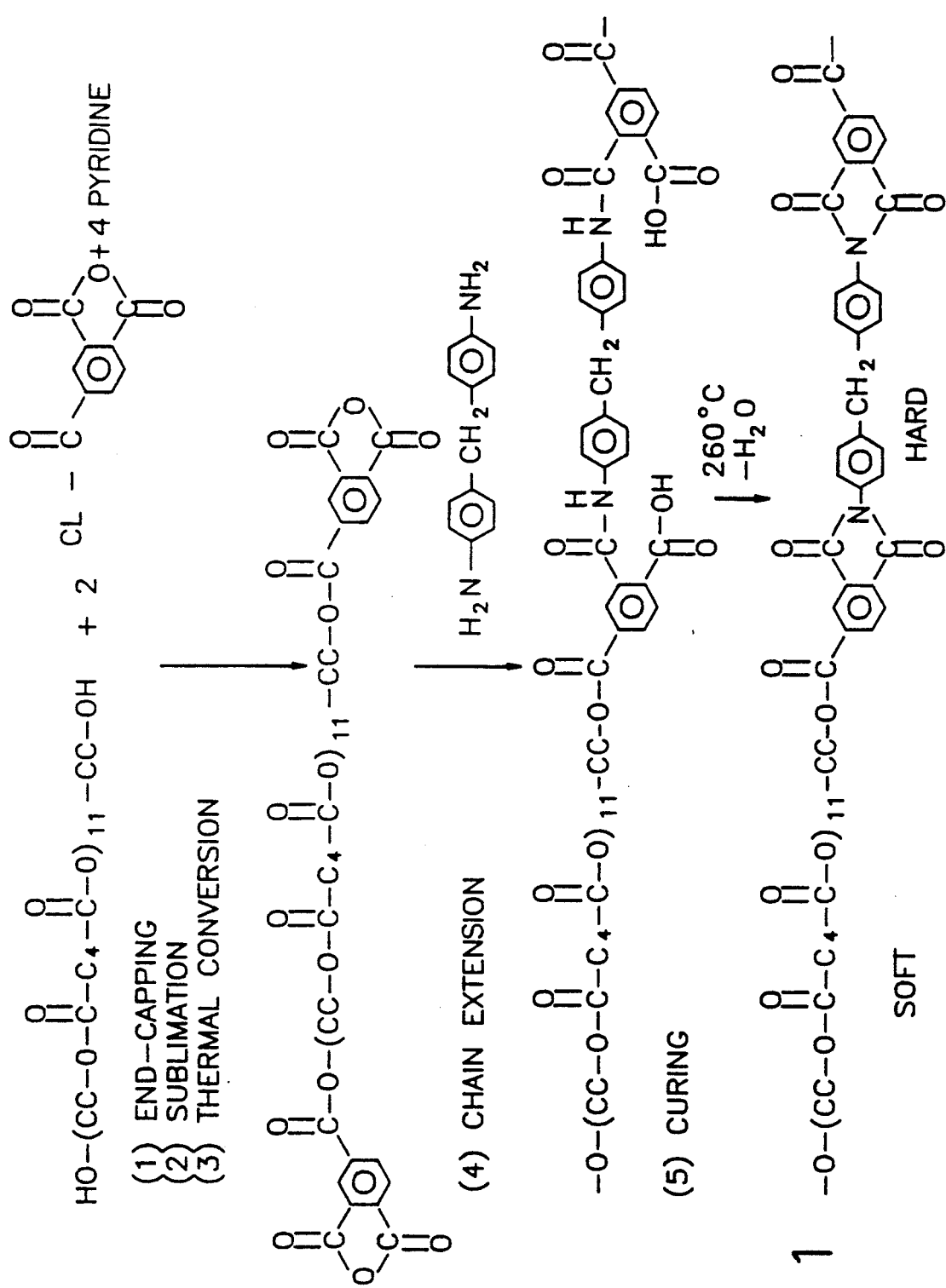
FIG. 1 shows schematically the synthesis of the composition of matter of the present invention.

The present invention includes new polyimide/-polyester copolymers without pendent carboxyl groups, a method for their synthesis, and their use to make membranes to separate aromatics/saturates mixtures into aromatics-enriched fractions and saturates-enriched fractions.

The membranes are useful for the separation of aromatics from saturates in petroleum and chemical streams and have been found to be particularly useful for the separation of large substituted aromatics from saturates as are encountered in heavy catalytic naphtha streams. Other streams which are also suitable feed streams for aromatics/saturates separation are intermediate catalytic naphtha streams boiling at 93° C.–160° C., light aromatics content streams boiling in the 40° C.–150° C. range, light catalytic cycle oil boiling in the 200° C.–345° C. range, jet fuel boiling in the 140° C.–180° C. range, diesel boiling in the 200° C.–365° C. range as well as streams in chemical plants which contain recoverable quantities of benzene, toluene, xylenes (BTX) or other aromatics in combination with saturates. Combinations of above streams are also suitable feed streams. The separation techniques which may successfully employ the membranes of the present invention include perstraction and pervaporation.

Perstraction involves the selective dissolution of particular components contained in a mixture into the membrane, the diffusion of those components through the membrane and the removal of the diffused components from the downstream side of the membrane by the use of a liquid sweep stream. In the perstractive separation of aromatics from saturates in petroleum or chemical streams, the aromatic molecules present in the feed stream dissolve into the membrane film more easily than the saturated molecules, due to similarities between the membrane solubility parameter and those of the aromatic species in the feed. The aromatics then permeate (diffuse) through the membrane and are swept away by a sweep liquid which is low in aromatics content. This keeps the concentration of aromatic at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $C_3$ to $C_6$ saturated hydrocarbons and lube basestocks ($C_{15}$-$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not. If $C_3$ or $C_4$ sweep liquids are used at 25° C. or above in liquid state, the pressure must be increased to keep them in the liquid phase.

Pervaporation, by comparison, is run at generally higher temperatures than perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and emerge on the permeate side under the influence of a concentration gradient. Pervaporation separation of aromatics from saturates can be performed at a temperature of about 25° C. for the separation of benzene from hexane but for separation of heavier aromatic/saturate mixtures, such as heavy catalytic naphtha, higher temperature of at least 80° C. and higher, preferably at least 100° C. and higher, more preferably at least 120° C. and higher should be used. Temperatures of about 200° C. have been successfully used with membranes prepared from polyimide/polyester copolymers of the present invention, the maximum upper limit being that temperature at which the membrane is physically damaged. Vacuum on the order of 1-80 mm Hg is pulled on the permeate side. The vacuum stream containing the permeate is cooled to condense out the highly aromatic permeate. Condensation temperature should be below the dew point of the permeate at a given vacuum level. In addition to a vacuum, a sweep gas may also be used in the permeate side.

The membrane itself may be in any convenient form utilizing any convenient module design. Thus, sheets of membrane material may be used in spiral-wound or plate-and-frame permeation cell modules. Tubes and hollow fibers of membranes may be used in bundled configurations with either the feed or the sweep liquid (or vacuum) in the internal space of the tube or fiber, the other material obviously being on the other side.

When the membrane is used in a hollow fiber configuration with the feed introduced on the exterior side of the fiber, the sweep liquid flows on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

FIG. 1 shows schematically the synthesis of the polyimide/aliphatic polyester copolymers without pendent carboxylic acid groups from polyethyleneadipatediol of molecular weight 2000, trimellitic anhydride acid chloride, and methylenedianiline at molar ratios of 1/2/1. The synthesis involves five steps: (1) end-capping, (2) sublimation, (3) thermal conversion, (4) chain extension, and (5) curing.

In the end-capping step, one mole of polyethyleneadipatediol, MW2000, reacted with two moles of trimellitic anhydride acid chloride in the presence of 4 moles of pyridine used to trap hydrochloric acid. This reaction was carried out at 75° C. for about two hours. Next, the pyridine hydrochloride was removed by sublimation at 115° C. with flowing nitrogen for four hours. During that time the excess pyridine was also removed.

Next the reaction product was heated at 230° C. with flowing nitrogen for three hours. This step was carried out to regenerate the anhydride groups that may have been hydrolyzed during the end-capping and sublimation steps.

The next step was a chain extension of the end-capped product with methylenedianiline in dimethylacetamide. The thick solution so obtained was cast. After evaporation of most of the solvent, the membrane was cured by heating, which closed the rings of amic acid groups to imide groups with simultaneous elimination of water.

The copolymers of the present invention can also be synthesized from aliphatic polyester diols other than polyethyleneadipatediol. Examples are polysuccinatediols, polymalonatediols, polyoxalatediols, and polyglutaratediols.

Instead of pyridine, other tertiary amines can be used, e.g., triethylamine. Instead of methylenedianiline, other aromatic diamines can be used, e.g., phenylene diamine, methylene di-o-chloroaniline (MOCA), methylene bis(dichloroaniline)(tetrachloro MDA), methylene dicyclohexylamine ($H_{12}$-MDA), methylene dichlorocyclohexylamine ($H_{12}$-MOCA), methylene bis(dichlorocyclohexylamine)(tetrachloro $H_{12}$-MDA),4,4'-(hexafluoroisopropylidene)-bisaniline (6F diamine),-3,3'-diaminophenyl sulfone (3,3'DAPSON),4,4'-diaminophenyl sulfone (4,4'DAPSON),4,4'-dimethyl-3,3'-diaminophenyl sulfone(4,4'-dimethyl-3,3'DAPSON),2,4-diamino cumene, methylene bis(o-toluidine), oxydianiline (ODA), bisaniline A, bisaniline M, bisaniline P, thiodianiline,2,2-bis[4-(4-aminophenoxy)phenyl]-propane (BAPP), bis([4-(4-aminophenoxy)phenyl] sulfone (BAPS), 4,4'-bis(4-aminophenoxy)biphenyl(-BAPB), 1,4'-bis(4-aminophenoxy)benzene (TPE-Q), and 1,3-bis(4-aminophenoxy)benzene (TPE-R).

The following formula represents the compositions of the polyimide/polyester copolymers of the present invention:

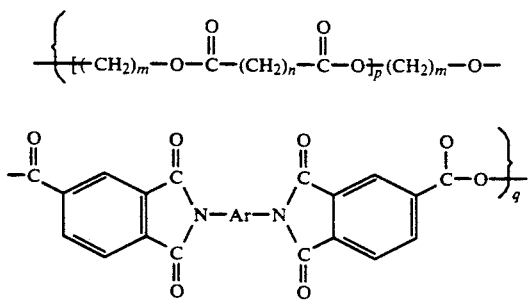

wherein Ar is an arylene group, m is 2 or 3, n is 0 through 4, p is 2 to 40, q is at least 5, and the number average molecular weight of the aliphatic polyester segment is between 500 and 5,000. An example of Ar is:

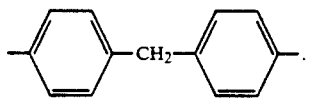

The membranes are used to separate aromatics from saturates in a pervaporation apparatus. The pervaporation apparatus is a cell, separted into two compartments by a porous metal plate, on which the membrane is supported. During a pervaporation experiment the aromatics/saturates mixture is circulated through the upper compartment at the desired temperature. The lower compartment is kept at reduced pressure. The permeate is collected in a trap, cooled with dry ice-acetone or dry ice-isopropanol, and periodically analyzed by gas chromatography. The feed contains 20 wt % isooctane, 10% toluene, 30% n-octane, and 40% p-xylene.

The following examples illustrate the invention without limiting it.

EXAMPLE 1

Synthesis of Polyimide/Polyadipate Copolymers Without Pendent Carboxylic Acid Groups 10 g (0.005 mole) polyethyleneadipatediol with a molecular weight of 2000 (PEA2000), 2.1 g (0.02 mole) trimellitic anhydride acid chloride (TMAC), and 1.58 g (0.02 mole) pyridine were put into a reactor under nitrogen. The content in the reactor was heated to 75° C. with stirring and kept at this temperature with continuous stirring for 2 hours to complete the step for the end-capping of PEA2000 with TMAC. At this point, the reactor content became milky due to the formation of the hydrochloric acid salt of pyridine. This salt was sublimed by heating the solution at 115° C. with flowing nitrogen and stirring for 4 hours, resulting in a clear, brown liquid. The liquid was heated at 230° C. and kept at this temperature with stirring for 3 hours (for the thermal conversion step described above), and it became the end-capped product. After this product was cooled down to 120° C., 27.39 g dimethylacetamide (DMAC) was added to have a solution with 30% concentration of this product. The solution was then cooled down to room temperature. To this solution was added 0.99 g (0.005 mole) methylene dianiline in 3 g DMAC solution for the chain extension step. A very viscous solution resulted, which indicated the chain extension reaction and additional DMAC was added to keep up with the viscosity increase. The resulting solution had 7.2% concentration of the copolymer with the polyamic acid hard segment and the polyadipate soft segment. This solution had suitable consistency for solution casting in the preparation of membranes.

The resulting solution was centrifuged for about 5 minutes. Following centrifugation, a membrane was knife-cast with a knife gap setting of 10 mils onto a microporous Teflon support with about 50 micron thickness, 0.2 micron pores and 80% porosity. DMAC was allowed to evaporate from the membrane in a nitrogen box in a hood at ambient conditions over a period of about 17 hours. The membrane was then dried in an oven at 120° C. overnight. Finally, the membrane was cured by heating it from room temperature to 260° C., maintaining it at this temperature for 20 minutes and then cooling it to room temperature. The resulting membrane containing 20 wt % polyimide hard segment and 80 wt % polyadipate soft segment, without pendent carboxylic acid groups had a thickness of about 7 microns excluding the microporous support. This polyimide hard segment did not contain chlorine atoms since methylene dianiline instead of methylene di-o-chloroaniline was used in this synthesis.

EXAMPLE 2

Pervaporation Results

Figure 2:
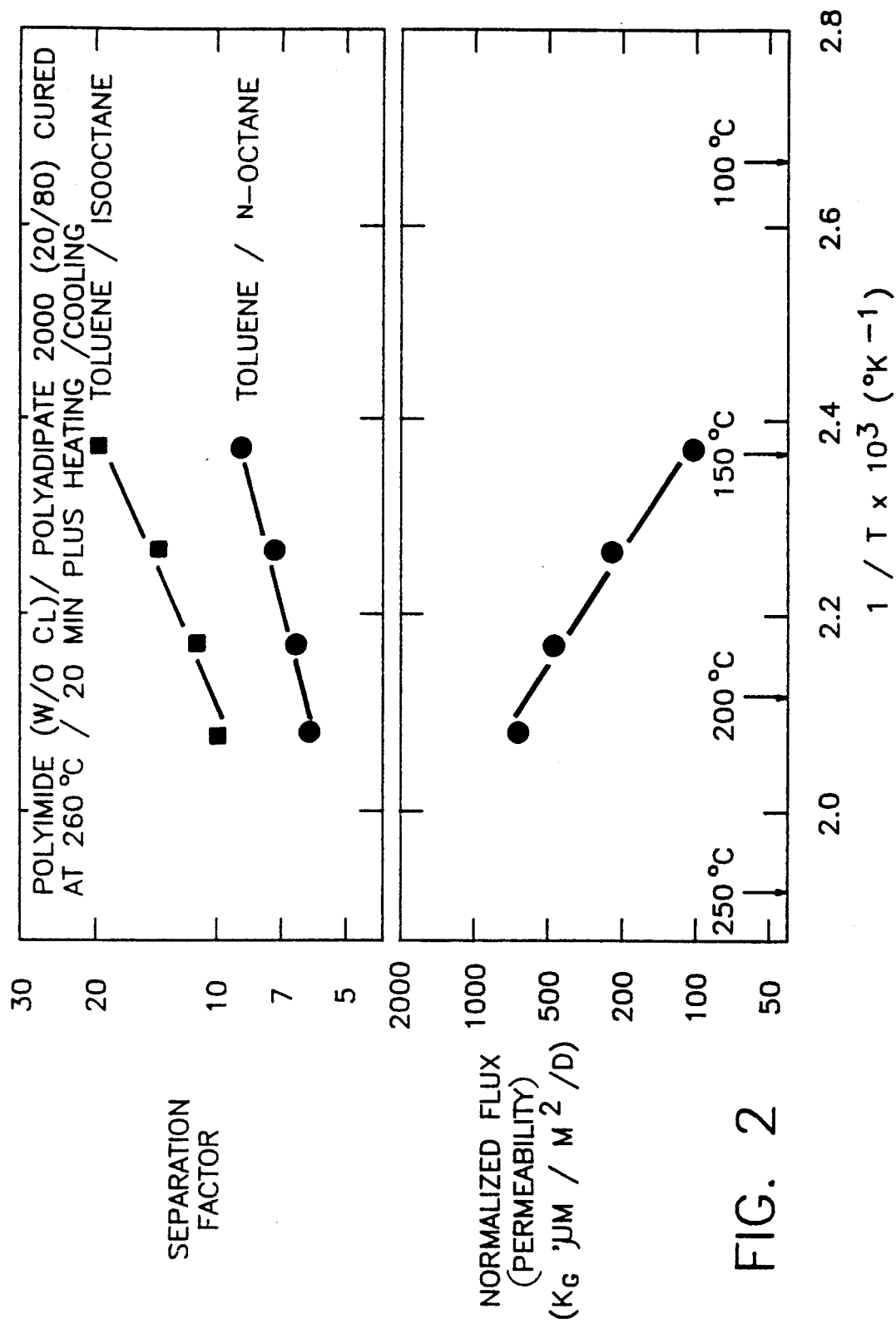
FIG. 2 shows the toluene/isooctane and toluene/n-octane selectivities and permeability for a copolymer membrane of the present invention, containing the hard segment of polyimide derived from trimellitic anhydride acid chloride and methylene dianiline (without chlorine atoms) and the soft segment of polyethylene adipate with a molecular weight of 2000 (PEA 2000), cured at 260° C. for 20 minutes (plus heating from room temperature to this temperature and cooling from this temperature to room temperature).
Figure 3:
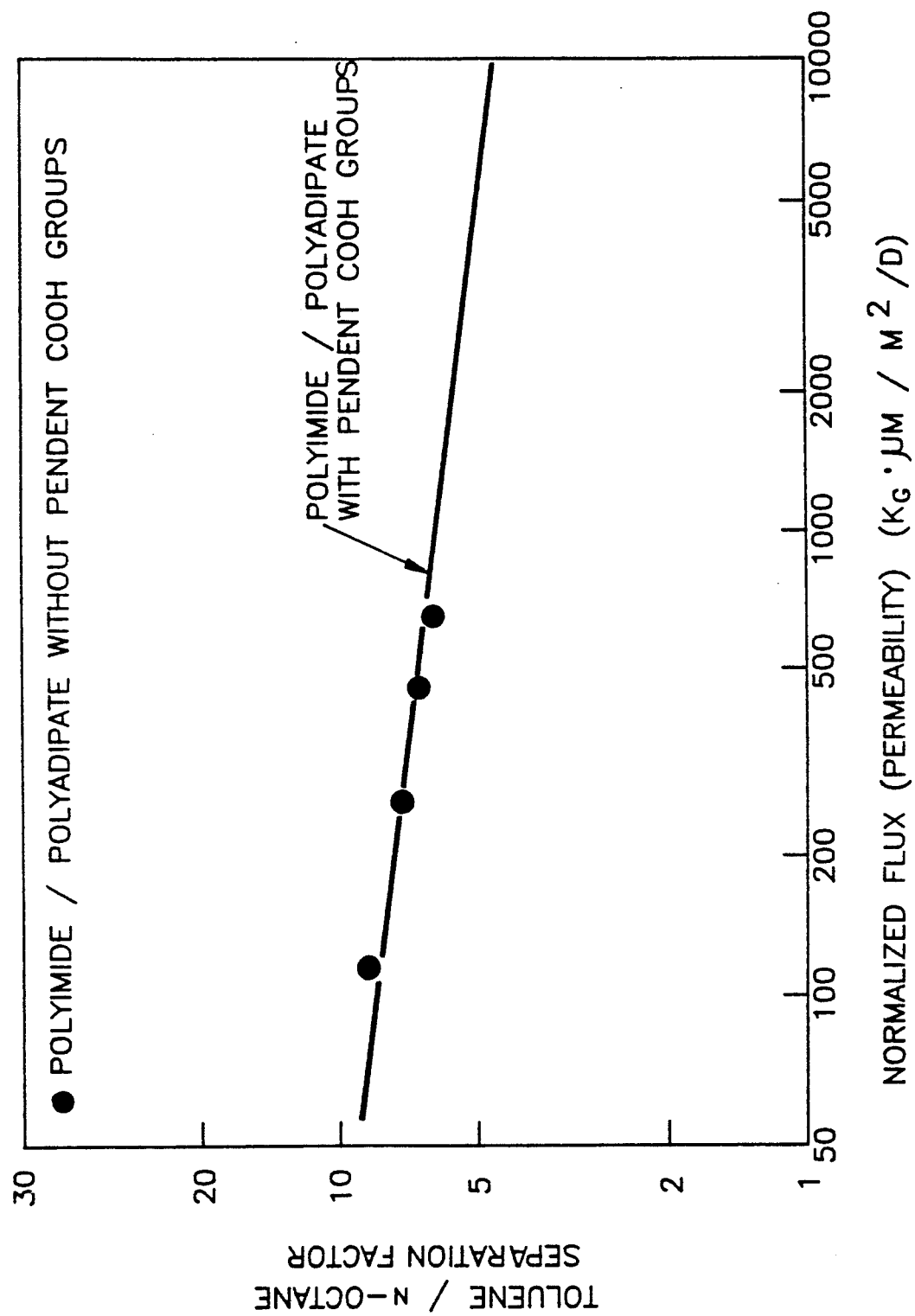
FIG. 3 shows the selectivity of polyimide/polyadipate copolymer membranes with and without pendent COOH groups.

The resulting membrane described in Example 1 was evaluated for aromatics/saturates separation with the feed containing 10 wt % toluene, 40 wt % p-xylene, 20 wt % isooctane, and 30 wt % n-octane in the pervaporation apparatus described above. FIG. 2 shows the good performance of this membrane in terms of toluene/isooctane and toluene/n-octane separation factors and normalized flux (permeability) as a function of temperature ranging from 150° to 210° C. In this figure, the separation factor is defined as the ratio of toluene and n-octane (or isooctane) concentrations in the permeate divided by the ratio of toluene and n-octane (or isooctane) concentrations in the feed. The normalized flux, i.e., permeability, is expressed in the unit of kilogram of the permeate per meter square membrane area per day for a normalized membrane thickness of 1 micron (Kg·μM/M²/D). FIG. 3 shows that the performance of this membrane (the polyimide/polyadipate copolymer without pendent carboxylic acid groups) is similar to that of a polyimide/polyadipate copolymer membrane with pendent carboxylic acid groups in the plot of toluene/n-octane separation factor versus normalized flux (permeability).

What is claimed is:

1. A new composition of matter having the formula:

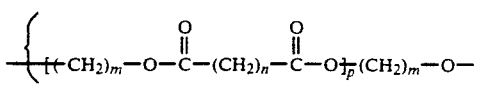

-continued

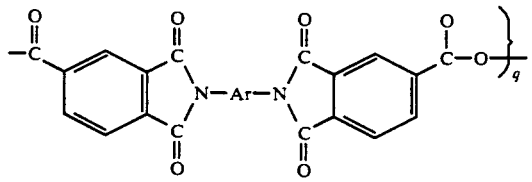

wherein Ar is an arylene group, m is 2 or 3, n is zero through 4, p is 2 to 40, q is at least 5, and the number average molecular weight of the aliphatic polyester segment is between 500 and 5,000.

2. A composition according to claim 1 wherein m is 2, n is 4, and Ar is

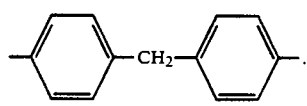

3. A composition according to claim 1 wherein m and n are 2 and Ar is

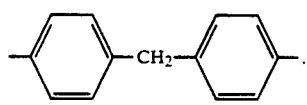

4. A process for the synthesis of compositions according to claim 1 wherein one mole of an aliphatic polyesterdiol reacts with two moles of trimellitic anhydride acid chloride in the presence of a tertiary amine, the tertiary amine hydrochloride is removed by sublimation, the end-capped product is treated thermally (at about 230° C.), and the end-capped product so obtained reacts with one mole of an aromatic diamine.

5. A process according to claim 4 wherein the aliphatic polyesterdiol is polyethyleneadipatediol and the aromatic diamine is 4,4'-methylenedianiline.

6. A process according to claim 4 wherein the aliphatic polyesterdiol is polyethylenesuccinatediol and the aromatic diamine is 4,4'-methylenedianiline.

7. A process according to claim 5 or 6 wherein the aliphatic polyesterdiol has a molecular weight comprised between 500 and 5,000.

8. A process according to claim 4, wherein the aliphatic polyesterdiol is polymalonatediol, polyoxalatediol, or polyglutaratediol.

9. A process according to claim 4 wherein the tertiary amine is pyridine.

10. A process according to claim 4 wherein said aromatic diamine is selected from the group consisting of phenylene diamine, methylene dianiline (MDA), methylene di-o-chloroaniline (MOCA), methylene bis(dichloroaniline)(tetrachloro MDA), methylene dicyclohexylamine ($H_{12}$-MDA), methylene dichlorocyclohexylamine ($H_{12}$-MOCA), methylene bis(dichlorocyclohexylamine)(tetrachloro $H_{12}$-MDA), 4,4'-(hexafluoroisopropylidene)-bisaniline(6F diamine), 3,3'-diaminophenyl sulfone (3,3'DAPSON), 4,4'-diaminophenyl sulfone (4,4'DAPSON), 4,4'-dimethyl-3,3'-diaminophenyl sulfone (4,4'-dimethyl-3,3'-DAPSON), 2,4-diamino cumene, methylene bis(o-toluidine), oxydianiline (ODA), bisaniline A, bisaniline M, bisaniline P, thiodianiline, 2,2-bis[4-(4-aminophenoxy)phenyl]propane (BAPP), bis[4-(4-aminophenoxy)phenyl]sulfone (BAPS), 4,4'-bis(4-aminophenoxy)biphenyl (BAPB), 1,4'-bis(4-aminophenoxy)benzene (TPE-Q), and 1,3-bis(4-aminophenoxy)benzene (TPE-R).

11. A process for separating mixtures of aromatics and saturates into aromatics-enriched and saturates-enriched streams comprising:
(a) contacting said aromatics/saturates mixture with one side of a membrane of polyimide/aliphatic polyester copolymer without pendent carboxylic acid groups and
(b) selectively permeating the aromatic components of the mixture through the membrane.

12. A process according to claim 11 wherein the polyimide/aliphatic polyester copolymer without pendent carboxylic acid groups is a composition according to claims 1-3.

13. A process according to claim 11 wherein the polyimide/aliphatic polyester copolymer without pendent carboxylic acid groups is prepared according to claims 4-10.

14. A process according to claim 11 wherein the aromatics/saturates mixture is selected from the group consisting of heavy catalytic naphtha streams, intermediate catalytic naphtha streams, light aromatic streams boiling in the 40°-150° C. range, light catalytic cycle oils boiling in the 200°-345° C. range, jet fuel boiling in the 140° C.-280° C. range, diesel boiling in the 200° C.-365° C. range, streams containing benzene, toluene, xylenes, other aromatics, and saturates, and combinations thereof.

* * * * *